United States Patent
Fan et al.

(10) Patent No.: US 12,098,970 B2
(45) Date of Patent: Sep. 24, 2024

(54) GENERALIZED AUTOCORRELATION METHOD FOR BEARING FAULT FEATURE EXTRACTION UNDER VARIABLE ROTATIONAL SPEED CONDITION

(71) Applicant: JIANGSU UNIVERSITY, Zhenjiang (CN)

(72) Inventors: Wei Fan, Zhenjiang (CN); Yingqi Xu, Zhenjiang (CN); Zhenqiang Chen, Zhenjiang (CN); Yujie Shen, Zhenjiang (CN); Long Chen, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/789,523

(22) PCT Filed: Feb. 10, 2022

(86) PCT No.: PCT/CN2022/075861
§ 371 (c)(1),
(2) Date: Jun. 28, 2022

(87) PCT Pub. No.: WO2023/015855
PCT Pub. Date: Feb. 16, 2023

(65) Prior Publication Data
US 2024/0201048 A1 Jun. 20, 2024

(30) Foreign Application Priority Data
Aug. 10, 2021 (CN) .......................... 202110913667.0

(51) Int. Cl.
*G01M 13/045* (2019.01)
(52) U.S. Cl.
CPC ................. *G01M 13/045* (2013.01)

(58) Field of Classification Search
CPC .... G01M 13/00; G01M 13/04; G01M 13/045; F16C 2233/00; F16C 19/00; F16C 19/52;
(Continued)

(56) References Cited

U.S. PATENT DOCUMENTS 9,110,862 B1    8/2015    O'Brien, Jr. et al.
2018/0188104 A1    7/2018    Arai et al.

FOREIGN PATENT DOCUMENTS

| CN | 102840907 A | 12/2012 |
|---|---|---|
| CN | 108507782 A | 9/2018 |
| CN | 110940522 A | 3/2020 |
| CN | 110987432 A | 4/2020 |

(Continued)

OTHER PUBLICATIONS

W. Fan, Y. Li, K. L. Tsui and Q. Zhou, "A Noise Resistant Correlation Method for Period Detection of Noisy Signals," in IEEE Transactions on Signal Processing, vol. 66, No. 10, pp. 2700-2710, May 15, 15, 2018. (Year: 2018).*

(Continued)

*Primary Examiner* — Daniel R Miller
*Assistant Examiner* — Matthew W. Baca
(74) *Attorney, Agent, or Firm* — Bayramoglu Law Offices LLC (57) ABSTRACT

A generalized autocorrelation method for bearing fault feature extraction under a variable rotational speed condition includes: resampling an original vibration signal in an order domain based on instantaneous phase information by using an order tracking processing method, to greatly weaken a frequency modulation phenomenon; further weakening background noise in consideration of a correlation between a plurality of adjacent fragments by using a generalized autocorrelation method; and controlling an accumulation of periodic disturbances by considering only a correlation between several adjacent signal fragments based on that conventional noise resistant correlation (NRC) methods (Continued)

consider a correlation between all signal fragments and cannot eliminate influence of accumulated periodic disturbances. Compared with the conventional methods, this method overcomes the difficulties caused by mutually restricting signal features, and achieves a better effect.

2 Claims, 7 Drawing Sheets

(58) Field of Classification Search
CPC ........ F16C 19/527; G06F 17/15; G06F 18/15; G06F 18/213; G06F 18/21342; G06F 18/21343; G06F 18/2163
See application file for complete search history.

(56) References Cited

FOREIGN PATENT DOCUMENTS

| | | |
|---|---|---|
| CN | 113984387 A | 1/2022 |
| JP | H09210765 A | 8/1997 |

OTHER PUBLICATIONS

Yongxiang Li, et al., Generalized Autocorrelation Method for Fault Detection Under Varying-Speed Working Conditions, IEEE Transactions on Instrumentation and Measurement, 2021, vol. 70, 3523111.
Wang Jianguo, et al., Rolling Bearing Vibration Signal Fault Feature Extraction Based on Autocorrelation Analysis and LMD, China Mechanical Engineering, 2014, pp. 186-191, vol. 25, Issue 2.

* cited by examiner

GENERALIZED AUTOCORRELATION METHOD FOR BEARING FAULT FEATURE EXTRACTION UNDER VARIABLE ROTATIONAL SPEED CONDITION

CROSS REFERENCE TO THE RELATED APPLICATIONS

This application is the national phase entry of International Application No. PCT/CN2022/075861, filed on Feb. 10, 2022, which is based upon and claims priority to Chinese Patent Application No. 202110913667.0, filed on Aug. 10, 2021, the entire contents of which are incorporated herein by reference.

TECHNICAL FIELD

The present invention belongs to the field of signal processing, and specifically relates to a generalized autocorrelation method for bearing fault feature extraction under a variable rotational speed condition.

BACKGROUND

As rolling bearings are key components commonly used in rotating machinery, it is of great significance to inspect rolling bearings accurately as early as possible. At present, the periodic detection of signals has been widely used in the fields of fault diagnosis and state detection of mechanical equipment. Due to the inevitable presence of a large amount of noise in the detection environment, periodic detection in the presence of strong background noise has always been a difficult problem in signal detection. Conventional time-domain methods such as variability method (VM) and anti-noise correlation method (noise resistant correlation, NRC) can be used for periodic detection in the presence of strong background noise, but are only suitable for strictly periodic signals and cannot be used to process signals contaminated by a large number of accumulated cyclic disturbances.

The most commonly used periodic detection method is to directly use the traditional autocorrelation function (ACF). ACF only considers two adjacent signal blocks, so the ACF method does not have the problem of accumulation of cyclic disturbances. However, due to the presence of strong background noise, the signal obtained by the ACF through transformation from the observed signal is still overwhelmed by the background noise. Therefore, the ACF method cannot suppress the strong background noise.

SUMMARY

In view of the above technical problems, the present invention proposes a generalized autocorrelation method for bearing fault feature extraction under a variable rotational speed condition. The present invention can achieve a balance between two mutually restricting features: suppression of strong background noise, and strictly periodic signals. It is proved by simulation and experiments that the GeACF method outperforms the conventional methods.

The following technical solutions are employed in the present invention.

A generalized autocorrelation method for bearing fault feature extraction under a variable rotational speed condition is provided, the method including following steps:

step S1, fusing an unknown fault signal $x(t)$ and a strong white Gaussian noise signal $\varepsilon(t)$ to obtain a measured order tracking signal $y(t)$, where the measured order tracking signal $y(t) = x(t) + \varepsilon(t)$, t represents an order domain, noise $\varepsilon(t) \sim \mathcal{N}(0, \sigma^2)$, a time series $y = [y(1), y(2), \ldots, y(L)]^T$ represents an implementation of a cyclic signal $y(t)$, and L represents a total number of samples;

step S2, truncating the measured order tracking signal $y(t)$, and when L=mN, dividing $y$ into $\{y_1, y_2, \ldots y_m\}$, where: $y_i = [y((i-1)N+1), \ldots, y(iN)]^T$, i=1, \ldots, m, m represents a number of signal fragments, and N represents a length of each of the signal fragments and is an independent variable in the function;

step S3, proposing a generalized autocorrelation function (GeACF) based on an original autocorrelation function (ACF), $$\mathcal{A}_y(N) = \frac{1}{m-n+1} \sum_{k=0}^{m-n} Q_y^k(N)$$

where:

$$Q_y^k(N) = \frac{1}{n(n-1)N} \sum_{1 \leq i \neq j \leq n} y_{k+i}^T y_{k+j},$$

where n is selected manually, satisfies ($2 \leq n \leq m$), and represents a number of block signals; and where $Q_y^k(N)$ is an NRC function:

$$Q_y^k(N) = \frac{1}{n(n-1)N} \sum_{1 \leq i \neq j \leq n} (y_{k+i}^k)^T y_{k+j}^k,$$

where n is selected manually, satisfies $2 \leq n \leq m$, and represents a number of block signals, and $y_{k+i}^k$ and $y_{k+j}^k$ represent discrete vector representations of a $(k+i)^{th}$ signal fragment and a $(k+j)^{th}$ signal fragment, respectively;

step S4, when L=Mn+N1 and N1>0, dividing $y$ into $\{y_{1,1}, y_{1,2}, y_{2,1}, y_{2,2}, \ldots, y_{m,1}, y_{m,2}, y_{m+1,1}\}$, where i=1, \ldots, m, N represents a length of a signal fragment and is an independent variable in the function, and where:

$$\begin{cases} y_{i,1} = [y((i-1)N+1), \ldots, y(((i-1))N+N_1)]^T \\ y_{i,2} = [y((i-1)N+N_1+1), \ldots, y(iN)]^T \end{cases};$$

step S5, synthesizing $\{y_{1,j}, y_{2,j}, \ldots, y_{mi,j}\}$ to form a new signal $r_j$, where j=1,2, m1=m+1, m2=m, and where:

$$\begin{cases} r_1 [y_{1,1}^T, y_{2,1}^T, \ldots y_{m1,1}^T]^T \\ r_2 = [y_{1,2}^T, y_{2,2}^T, \ldots, y_{m2,2}^T]^T \end{cases};$$

proposing a generalized autocorrelation function (GeACF) $\mathcal{A}(N) = w_1 \mathcal{A}_{r_1}(N_1) + w_2 \mathcal{A}_{r_2}(N_2)$, where $w_1$ and $w_2$ are respectively weights of autocorrelation functions $\mathcal{A}_{r_1}(N_1)$ and $\mathcal{A}_{r_2}(N_2)$ of signals $r_1$ and $r_2$, and $w_1 + w_2 = 1$;

step S6, for the signal $\mathcal{Y}$ of the length L≥2N, if n=2, the GeACF is equal to the ACF, i.e., $\mathcal{A}(N)=\mathcal{R}(N)$, the GeACF being an ACF, where:

$$\mathcal{A}(N) = \frac{\mathcal{Y}_{m,1}^T \mathcal{Y}_{m+1,1} + \sum_{i=1}^{m-1} \mathcal{Y}_i^T \mathcal{Y}_{i+1}}{L-N} = \frac{1}{L-N}\sum_{i=1}^{L-N}\mathcal{Y}(i)\mathcal{Y}(i+N) = \mathcal{R}(N);$$

and step S7, for the signal $\mathcal{Y}$ of the length L≥2N, an expectation of the GeACF being not greater than an average power $\mathcal{P}_\mathcal{X}$ of the original signal $\mathcal{X}(t)$, i.e., E[$\mathcal{A}(N)$]≥ $\mathcal{P}_\mathcal{X}$, where:

$$\mathcal{P}_x = \frac{1}{n(L-(N-1)N)}\sum_{i=0}^{n-1}\sum_{j=1}^{L-(N-1)N} x(iN+j)^2,$$

$$E[\mathcal{A}(N)] = E[w_1 \mathcal{A}_{r_1}(N_1) + w_2 \mathcal{A}_{r_2}(N_2)] \leq$$

$$\frac{\sum_{i=1}^{n}\left(\sum_{k=0}^{m_1-n} x_{k+1,1}^T x_{k+i,1} + \sum_{k=0}^{m_2-n} x_{k+i,2}^T x_{k+i,2}\right)}{n(m_i-n+1)N_1 + n(m_2-n+1)N_2} =$$

$$\frac{1}{n(L-(N-1)N)}\sum_{i=0}^{n-1}\sum_{j=1}^{L-(N-1)N} x(iN+j)^2.$$

The beneficial effects of the present invention are as follows. A generalized autocorrelation method for bearing fault feature extraction under a variable rotational speed condition is provided, which can overcome the two mutually restricting difficulties: strong background noise and accumulation of periodic disturbances. It is proved by simulation and experiments that this method has better performance than conventional methods. The present invention discloses a generalized autocorrelation method for bearing fault feature extraction under a variable rotational speed condition, which is used in combination with a periodic estimation method to achieve a balance between accumulated cycles and strong background noise and is used for bearing fault diagnosis under the variable rotational speed condition. The method of the present invention includes: resampling an original vibration signal in an order domain based on instantaneous phase information by using an order tracking processing method, to greatly weaken a frequency modulation phenomenon; further weakening background noise in consideration of a correlation between a plurality of adjacent fragments by using a generalized autocorrelation method; and controlling an accumulation of periodic disturbances by considering only a correlation between several adjacent signal fragments based on that conventional NRC methods consider a correlation between all signal fragments and cannot eliminate influence of accumulated periodic disturbances. Compared with the conventional methods, this method overcomes the difficulties caused by mutually restricting signal features, and achieves a better effect.

BRIEF DESCRIPTION OF THE DRAWINGS

FIG. 1A shows the case when n=8, FIG. 1B shows the case when n=12, and FIG. 1C shows the case when n=16.

FIGS. 5A-5D show experimental data from University of Ottawa, which is analysis results of fault signals using different methods under order tracking with gear interference, where FIG. 5A shows the case using an autocorrelation analysis (ACF) method, FIG. 5B shows the case using a strictly periodic signal analysis method (NRC), FIG. 5C shows the case using a strictly periodic signal analysis method (VM), and FIG. 5D shows the cases using a generalized autocorrelation method (GeACF).

FIGS. 6A-6F show analysis results of fault signals using different methods under order tracking on a self-made test bench, where FIG. 6A shows the case using an autocorrelation analysis (ACF) method, FIG. 6B shows the case using a strictly periodic signal analysis method (NRC), FIG. 6C shows the case using a strictly periodic signal analysis method (VM), and FIGS. 6D-6F show the cases using a generalized autocorrelation method (GeACF).

DETAILED DESCRIPTION OF THE EMBODIMENTS

The present invention will be further described in detail below with reference to drawings and specific embodiments, but the present invention is not limited thereto.

A generalized autocorrelation method for bearing fault feature extraction under a variable rotational speed condition is provided, the method including following steps.

Step S1. An unknown fault signal $\mathcal{X}(t)$ and a strong white Gaussian noise signal ε(t) are fused to obtain a measured order tracking signal $\mathcal{Y}(t)$, where the measured order tracking signal $\mathcal{Y}(t)=\mathcal{X}(t)+\varepsilon(t)$, t represents an order domain, the noise $\varepsilon(t) \sim \mathcal{N}(0, \sigma_2)$, where a time series $\mathcal{Y}=[\mathcal{Y}(1), \mathcal{Y}(2), \ldots, \mathcal{Y}(L)]^T$ represents an implementation of a cyclic signal $\mathcal{Y}(t)$, and L represents a total number of samples.

Figure 1A:
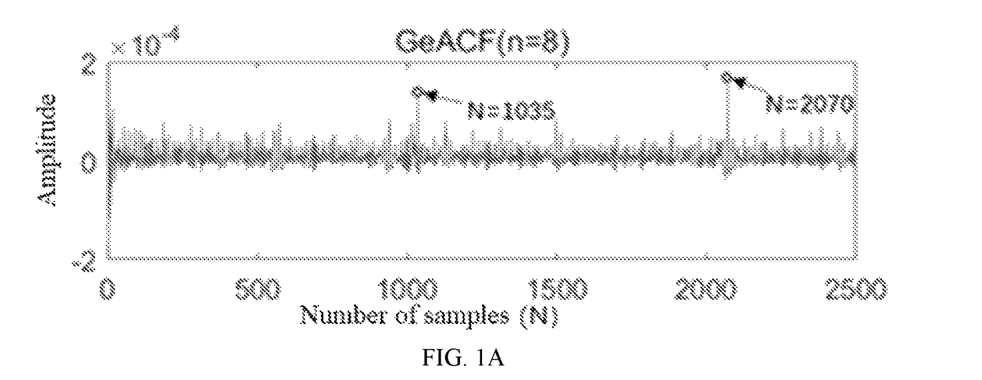
FIGS. 1A-1C show signal analysis results of an application of a generalized autocorrelation method to bearing fault detection under orderless tracking, where there are obvious peaks at periodic and multiple points.
Figure 1B:
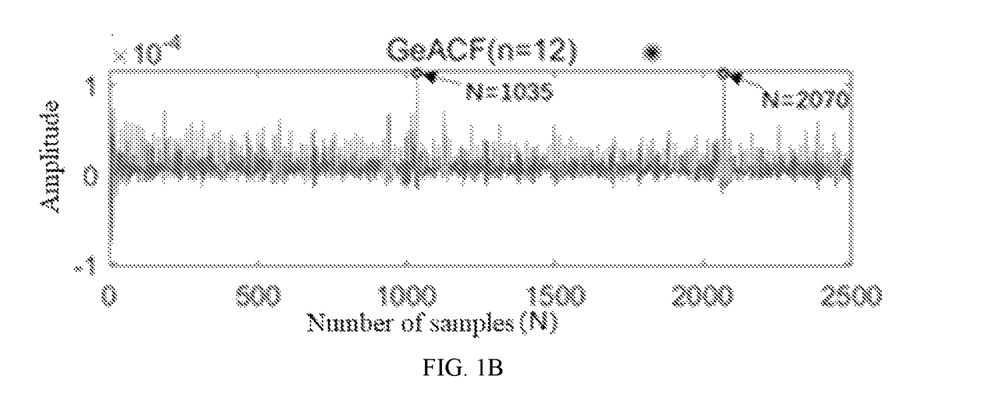
Figure 1C:
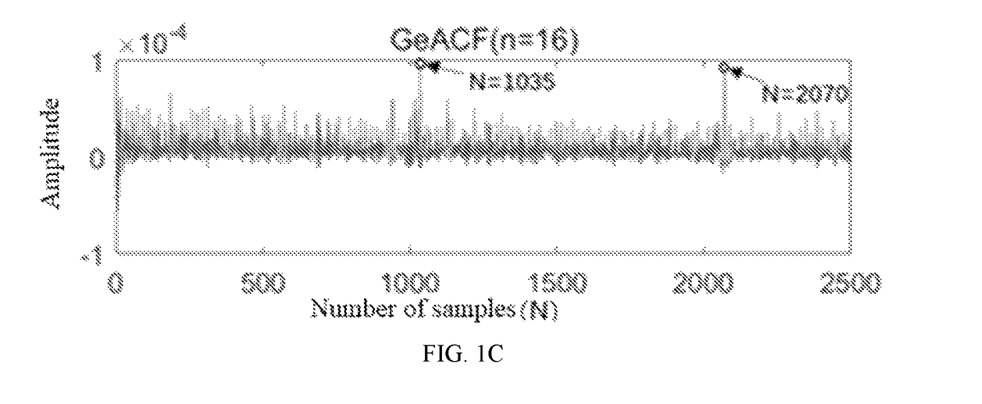
Figure 2:
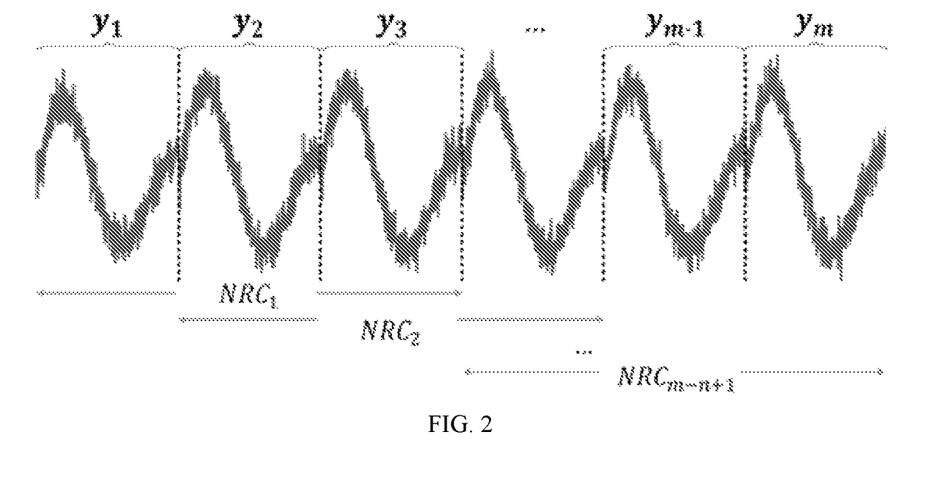
FIG. 2 shows the division of signals according to a generalized autocorrelation algorithm when L=mN(m>1).

Step S2. When L=mN, $\mathcal{Y}$ is divided into $\{\mathcal{Y}_1, \mathcal{Y}_2, \ldots \mathcal{Y}_m\}$, as shown in FIG. 2.

$\mathcal{Y}_i=[\mathcal{Y}((i-1)N+1), \ldots, \mathcal{Y}(iN)]^T$, i=1, ..., m, N represents a length of each of the signal fragments and is an independent variable in the function.

Step S3. A generalized autocorrelation function (GeACF) is proposed based on an original autocorrelation function (ACF), $$\mathcal{A}_\mathcal{Y}(N) = \frac{1}{m-n+1}\sum_{k=0}^{m-n} \mathcal{A}_\mathcal{Y}^k(N)$$

where:

$$\mathcal{A}_\mathcal{Y}^k(N) = \frac{1}{n(n-1)N}\sum_{1 \leq i \neq j \leq n} \mathcal{Y}_{k+i}^T \mathcal{Y}_{k+j},$$

where n is selected manually, satisfies 2≤n≤m, and represents a number of block signals.

Figure 3:
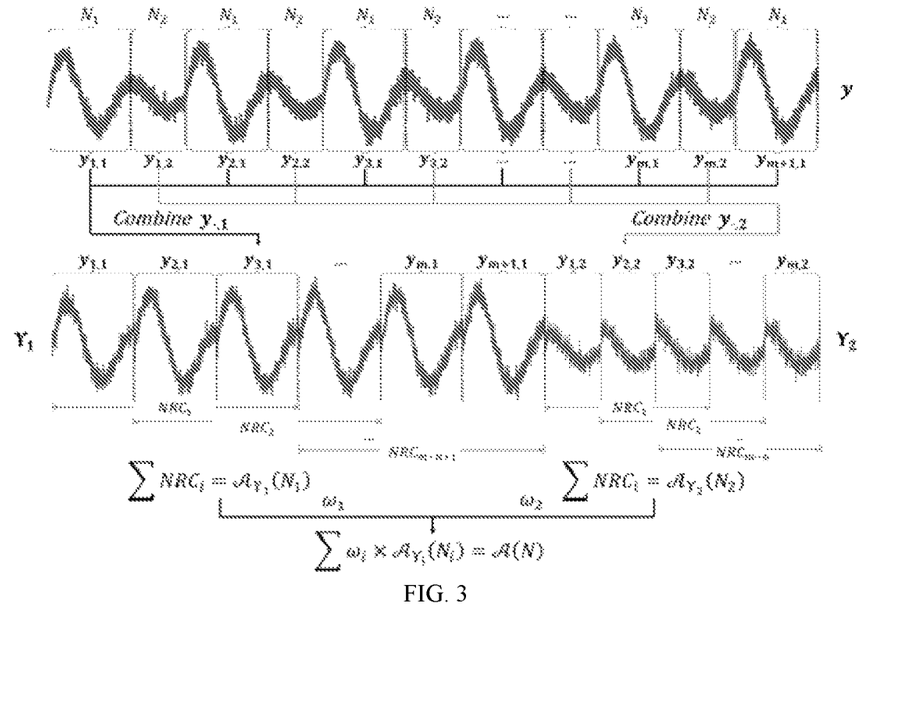
FIG. 3 shows the division of signals according to a generalized autocorrelation algorithm when L=Mn+N1 (m>1, N1>0).

Step S4. When L=Mn+N1 and N1>0, $\mathcal{Y}$ is divided into $\{\mathcal{Y}_{1,1}, \mathcal{Y}_{1,2}, \mathcal{Y}_{2,1}, \mathcal{Y}_{2,2}, \ldots, \mathcal{Y}_{m,1}, \mathcal{Y}_{m,2}, \mathcal{Y}_{m+1,1}\}$, where i=1, . . . , m, N represents a length of a signal fragment and is an independent variable in the function, as shown in FIG. 3.

$$\begin{cases} \mathcal{Y}_{i,1} = [\mathcal{Y}((i-1)N+1), \ldots, \mathcal{Y}(((i-1))N+N_1]^T \\ \mathcal{Y}_{i,2} = [\mathcal{Y}((i-1)N+N_1+1), \ldots, \mathcal{Y}(iN)]^T \end{cases}$$

Step S5. $\{\mathcal{Y}_{1,j}, \mathcal{Y}_{2,j}, \ldots \mathcal{Y}_{mi,j}\}$ is synthesized to form a new signal $r_j$, where j=1,2, and m1=m+1, m2=m.

$$\begin{cases} r_1 = [\mathcal{Y}_{1,1}^T, \mathcal{Y}_{2,1}^T, \ldots \mathcal{Y}_{m1,1}^T]^T \\ r_2 = [\mathcal{Y}_{1,2}^T, \mathcal{Y}_{2,2}^T, \ldots, \mathcal{Y}_{m2,2}^T]^T \end{cases}$$

A generalized autocorrelation function (GeACF) $\mathcal{A}(N)= w\mathcal{A}_{r_1}(N_1)+w\mathcal{A}_{r_2}(N_2)$ is proposed. NRC values of all adjacent fragments are calculated, and a weighted sum of the NRC values is calculated.

Finally, the proposed GeACF is defined:

$$\mathcal{A}(N) = \begin{cases} \mathcal{A}_y(N) & \mathcal{L} = mN \\ w_1\mathcal{A}_{r_1}(N_1) + w_2\mathcal{A}_{r_2}(N_2) & \mathcal{L} \neq mN \end{cases}$$

Figure 4:
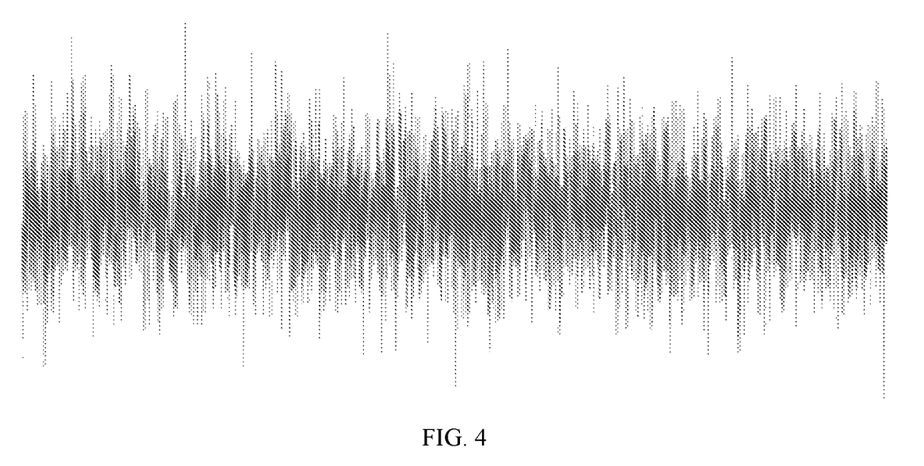
FIG. 4 is a simulation waveform diagram of a resampling signal.
Figure 5A:
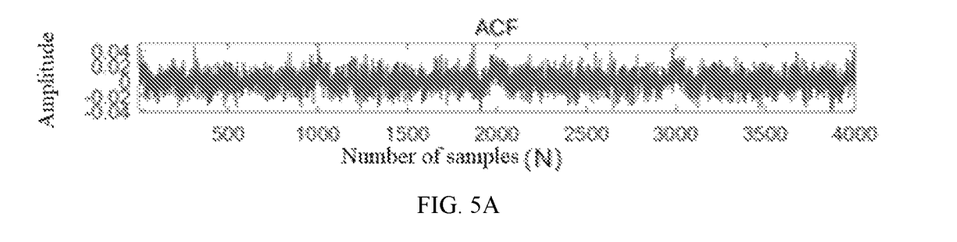
Figure 5B:
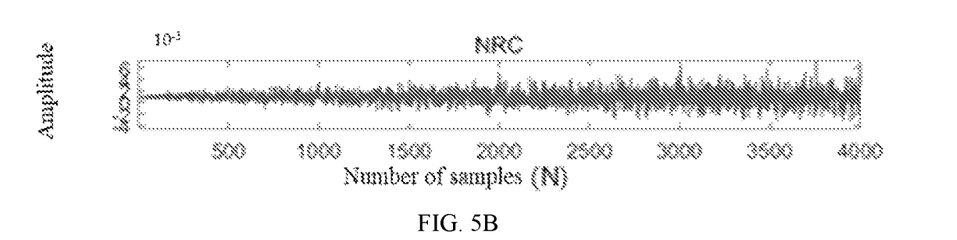
Figure 5C:
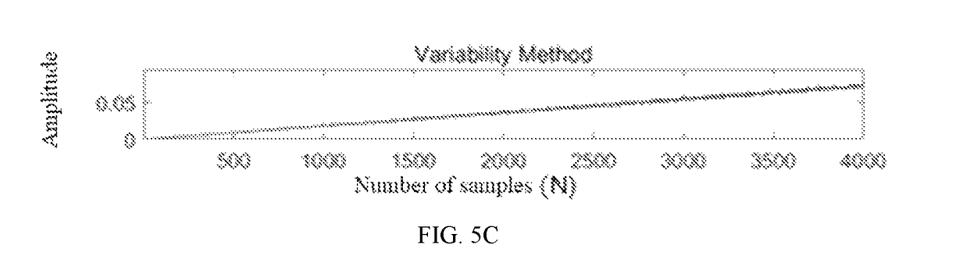
Figure 5D:
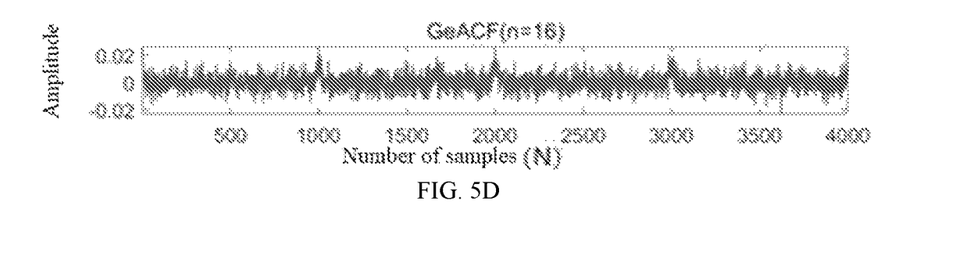
Figure 6A:
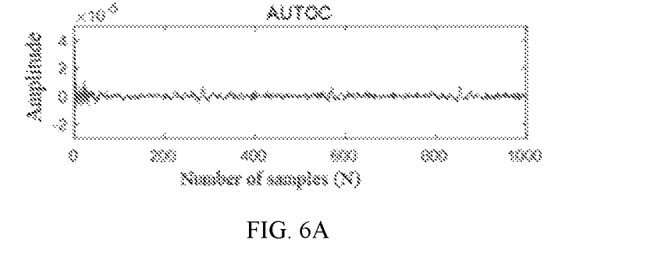
Figure 6B:
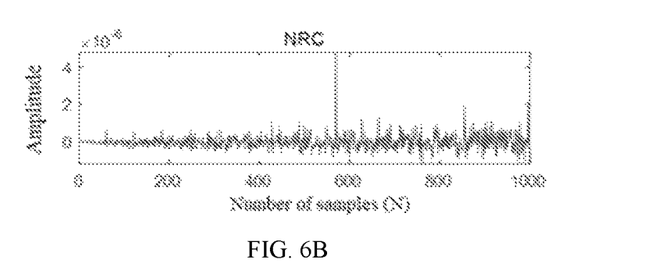
Figure 6C:
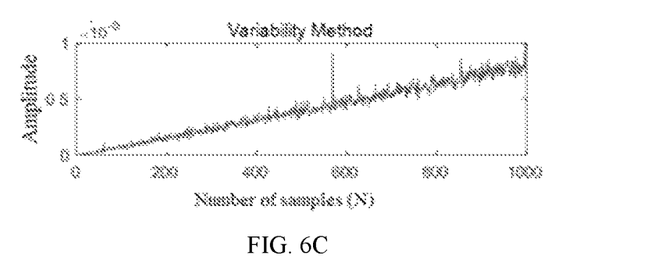
Figure 6D:
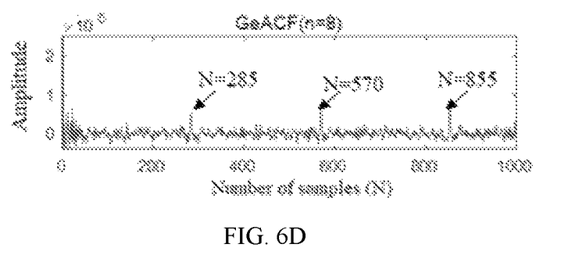
Figure 6E:
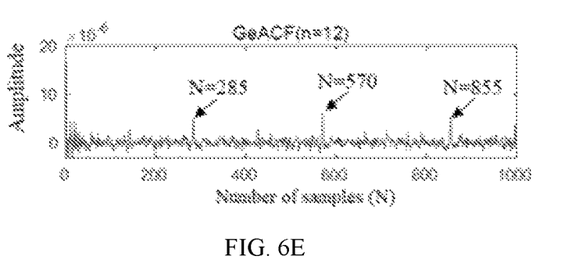
Figure 6F:
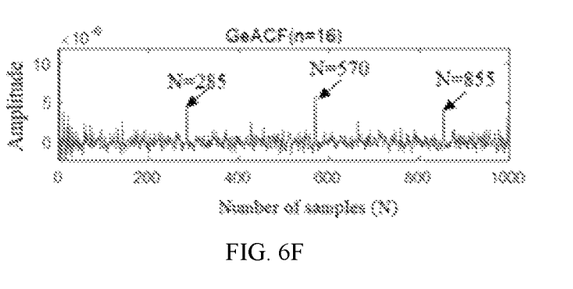

The $\mathcal{A}(N)$ method is used in simulations and experiments of the present invention. A resampling signal is simulated. $\mathcal{Y}(N)=\mathcal{X}(N)+\varepsilon(N)$, N≤L. As shown in FIG. 4, a simulated signal is $$\mathcal{X}(N) = \sum \left\lfloor \frac{L}{P_0} \right\rfloor_{k=1} e^{\frac{-\zeta 2\pi \frac{f}{f_s}(N-P_k)}{\sqrt{1-\zeta^2}}} \sin 2\pi \frac{f}{f_s}(N-P_k), \varepsilon(N) \sim \mathcal{N}(0, \sigma).$$

The simulation results are shown in FIGS. 5A-5D. The results show that there are many interference peaks in the case of using the ACF (autocorrelation function) to process the signal, and the signal period cannot be accurately determined; the NRC method cannot generate identifiable peaks; the Variability Method does not meet the desired signal conditions and exhibits a significant shift; and for the GeACF (n=16), there are obvious peaks at the true periodic and multiple points. The simulation results show that the GeACF method has a stronger ability to suppress noise.

To further verify the effectiveness of the GeACF method, the proposed method is validated using a case with inner ring fault data and a case with outer ring fault data. A first set of data was collected from University of Ottawa, and a second set of data was collected on a self-made test bench.

For the first set of data from University of Ottawa, a signal length is 2,000,000, an acceleration sampling rate is 200 kHz, a vibration signal and an optical pulse signal are used for dual-channel measurement, and the bearing runs at uniform acceleration, with gear interference, and with great periodic fluctuations and a low signal-to-noise ratio. The order tracking method is used for signal resampling, i.e., a peak value of an optical pulse signal and a corresponding vibration signal are selected using phase information of the optical pulse signal, and the signals are resampled in the order domain. As shown in FIGS. 6A-6F, the experimental results show that the autocorrelation method has no obvious peaks, and cannot detect the real period due to the strong background noise of the signal; for the strictly periodic signal analysis methods such as NRC and VM, there are no obvious peaks at periodic points, the number of interference peaks is large, and the accumulation of periodic disturbances also fails; the generalized autocorrelation method balances periodic disturbances and background noise, and has strong robustness regardless of whether there are disturbances from other equipment or not.

For the second set of data from the self-made test bench, a vibration signal and an optical pulse signal are used for dual-channel measurement, and the bearing runs at a variable rotational speed, with great periodic fluctuations and a high signal-to-noise ratio. The experimental results show that although the autocorrelation method cannot provide clear peaks despite of the continuous periodic fluctuations, because the period feature is overwhelmed by strong background noise; the NRC and VM methods fail to detect the real period of the resampled signal due to the accumulated period disturbances; and for the GeACF method, there are obvious peaks at periodic and multiple points, and periodic disturbances and background noise are well balanced.

In the description of the specification, the description with reference to the terms "an embodiment", "some embodiments", "exemplary embodiments", "example", "specific example", or "some example" and so on means that specific features, structures, materials or characteristics described in connection with the embodiment or example are embraced in at least one embodiment or example of the present invention. In the present specification, the illustrative expression of the above terms is not necessarily referring to the same embodiment or example. Moreover, the described specific features, structures, materials or characteristics may be combined in any suitable manner in one or more embodiments.

Although the embodiments of the present invention have been illustrated and described above, it is to be understood by those of ordinary skill in the art that various changes, alterations, replacements and modifications can be made to these embodiments without departing from the principle and spirit of the present invention. The scope of the present invention is defined by the appended claims and equivalents thereof.

What is claimed is:

1. A generalized autocorrelation method for a bearing fault feature extraction under a variable rotational speed condition, comprising the following steps:

step S1, fusing an unknown fault signal $\mathcal{X}(t)$ and a strong white Gaussian noise signal $\varepsilon(t)$ to obtain a measured order tracking signal $\mathcal{Y}(t)$, wherein the measured order tracking signal $\mathcal{Y}(t)=\mathcal{X}(t)+\varepsilon(t)$, t represents an order domain, a time series $\mathcal{Y}=[\mathcal{Y}(1), \mathcal{Y}(2), \ldots, \mathcal{Y}(L)]^T$ represents an implementation of a cyclic signal $\mathcal{Y}(t)$, and L represents a total number of samples;

step S2, truncating the measured order tracking signal $\mathcal{Y}(t)$, and when L=mN, dividing $\mathcal{Y}$ into $\{\mathcal{Y}_1, \mathcal{Y}_2, \ldots \mathcal{Y}_m\}$, wherein $\mathcal{Y}_i=[\mathcal{Y}((i-1)N+1), \ldots, \mathcal{Y}(iN)]^T$, i=1, . . . , m, m represents a number of signal fragments, and N represents a length of each of the signal fragments and is an independent variable;

step S3, proposing a generalized autocorrelation function based on an original autocorrelation function $$\mathcal{A}_y(N) = \frac{1}{m-n+1}\sum_{k=0}^{m-n}\mathcal{C}_y^k(N),$$

wherein $Q_y^k(N)$ is a noise resistant correlation function:

$$Q_y^k(N) = \frac{1}{n(n-1)N} \sum_{1 \leq i \neq j \leq n} (\mathcal{Y}_{k+i}^k)^T \mathcal{Y}_{k+j}^k,$$

wherein n is selected manually, satisfies 2≤n≤m, and represents a number of block signals, and $\mathcal{Y}_{k+i}^k$ and $\mathcal{Y}_{k+j}^k$ represent discrete vector representations of a $(k+i)^{th}$ signal fragment and a $(k+j)^{th}$ signal fragment, respectively;

step S4, when L=Mn+N1 and N1>0 dividing $\mathcal{Y}$ into { $\mathcal{Y}_{1,1}, \mathcal{Y}_{1,2}, \mathcal{Y}_{2,1} \mathcal{Y}_{2,2}, \ldots, \mathcal{Y}_{m,1}, \mathcal{Y}_{m,2}, \mathcal{Y}_{m+1,1}$ }, wherein $$\begin{cases} \mathcal{Y}_{i,1} = [\mathcal{Y}((i-1)N+1, \ldots, \mathcal{Y}(((i-1))N+N_1)]^T \\ \mathcal{Y}_{i,2} = [\mathcal{Y}((i-1)N+N_1+1), \ldots, \mathcal{Y}(iN)]^T \end{cases};$$

i=1, . . . , m, N represents a length of each of the signal fragments and is an independent variable;

step S5, synthesizing { $\mathcal{Y}_{1,j}; \mathcal{Y}_{2,j}, \ldots, \mathcal{Y}_{mi,j}$ } to form a new signal $r_j$, wherein j=1,2, m1=m+1, m2=m, and $$\begin{cases} r_1 = [\mathcal{Y}_{1,1}^T, \mathcal{Y}_{2,1}^T, \ldots \mathcal{Y}_{m1,1}^T]^T \\ r_2 = [\mathcal{Y}_{1,2}^T, \mathcal{Y}_{2,2}^T, \ldots, \mathcal{Y}_{m2,2}^T]^T \end{cases};$$

proposing a generalized autocorrelation function $w(N) = w_1 w_{r_1}(N_1) + w_2 \mathcal{X}_{r_2}(N_2)$, wherein $w_1$ and $w_2$ are respectively weights of autocorrelation functions $w_{r_1}(N_1)$ and $w_{r_2}(N_2)$ of signals $r_1$ and $r_2$, and $w_1+w_2=1$;

step S6, for the signal $\mathcal{X}$ of the length L≥2N, if n=2, $\mathcal{X}(N) = \mathcal{X}(N)$, the generalized autocorrelation function being an autocorrelation function, and $$\mathcal{A}(N) = \frac{\mathcal{Y}_{m,1}^T \mathcal{Y}_{m+1,1} + \sum_{i=1}^{m-1} \mathcal{Y}_i^T \mathcal{Y}_{i+1}}{L-N} = \frac{1}{L-N} \sum_{i=1}^{L-N} \mathcal{Y}(i)\mathcal{Y}(i+N) = \mathcal{R}(N);$$

and step S7, for the signal $\mathcal{Y}$ of the length L≥2N, an expectation of the generalized autocorrelation function being not greater than an average power $P\mathcal{X}$ of an original signal $\mathcal{X}(t)$, i.e.

$$\mathcal{P}_x = \frac{1}{n(L-(N-1)N)} \sum_{i=0}^{n-1} \sum_{j=1}^{L-(N-1)N} x(iN+j)^2,$$

$$E[\mathcal{A}(N)] = E[w_1 \mathcal{A}_{r_1}(N_1) + w_2 \mathcal{A}_{r_2}(N_2)] \leq$$

$$\frac{\sum_{i=1}^{n} \left( \sum_{k=0}^{m_1-n} x_{k+i,1}^T x_{k+i}, 1 + \sum_{k=0}^{m_2-n} x_{k+i,2}^T x_{k+i}, 2 \right)}{n(m_1-n+1)N_1 + n(m_2-n+1)N_2} =$$

$$\frac{1}{n(L-(N-1)N)} \sum_{i=0}^{n-1} \sum_{j=1}^{L-(N-1)N} x(iN+j)^2.$$

2. The generalized autocorrelation method for the bearing fault feature extraction under the variable rotational speed condition according to claim 1, wherein the step of truncating the measured order tracking signal comprises:

when the original signal is exactly divisible into m fragments each with a length N and n in a noise resistant correlation is determined manually, a length of the original signal being exactly a multiple of a period and N being exactly the period; if L is not exactly divisible by N, dividing the original signal into two sub-signals each comprising several signal fragments, constructing a series of noise resistant correlation functions based on the signal fragments, and using a weighted sum of the noise resistant correlation functions to suppress a strong background noise;

$$\mathcal{A}(N) = \begin{cases} \mathcal{A}_y(N) & \mathcal{L} = mN \\ w_1 \mathcal{A}_{r_1}(N_1) + w_2 \mathcal{A}_{r_2}(N_2) & \mathcal{L} \neq mN \end{cases}$$

$$w_2 = 1 - w_1$$

$$w_1 = \frac{(m_1-n+1)N_1}{(m_1-n+1)N_1 + (m_2-n+1)N_2}.$$

* * * * *